United States Patent
Tanaka et al.

(10) Patent No.: US 8,787,839 B2
(45) Date of Patent: Jul. 22, 2014

(54) MOBILE COMMUNICATION TERMINAL TEST DEVICE AND MOBILE COMMUNICATION TERMINAL TEST METHOD

(75) Inventors: Junya Tanaka, Atsugi (JP); Yasuyuki Matsuyama, Atsugi (JP); Takuma Goto, Atsugi (JP)

(73) Assignee: Anritsu Corporation, Atsugi-Shi (JP)

( * ) Notice: Subject to any disclaimer, the term of this patent is extended or adjusted under 35 U.S.C. 154(b) by 276 days.

(21) Appl. No.: 13/531,824

(22) Filed: Jun. 25, 2012

(65) Prior Publication Data

US 2013/0005384 A1    Jan. 3, 2013

(30) Foreign Application Priority Data

Jun. 29, 2011 (JP) ................................. 2011-144517

(51) Int. Cl.
*H04B 17/00* (2006.01)
*H04M 1/24* (2006.01)

(52) U.S. Cl.
CPC ...................................... *H04M 1/24* (2013.01)
USPC ...................... 455/67.14; 455/115.2; 455/522; 455/550.1

(58) Field of Classification Search
USPC ............. 455/67.11, 67.14, 115.1, 115.2, 517, 455/522, 550.1, 552.1
See application file for complete search history.

(56) References Cited

U.S. PATENT DOCUMENTS

| | | | | |
|---|---|---|---|---|
| 6,418,321 | B1 * | 7/2002 | Itoh ............................... | 455/522 |
| 7,428,424 | B2 * | 9/2008 | Hwang et al. ................. | 455/522 |
| 8,046,020 | B2 * | 10/2011 | Lee et al. ...................... | 455/522 |
| 8,712,346 | B2 * | 4/2014 | Manpo ....................... | 455/115.1 |
| 2010/0120371 | A1 | 5/2010 | Sato et al. | |

FOREIGN PATENT DOCUMENTS

JP    2010136341 A    6/2010

\* cited by examiner

*Primary Examiner* — Nhan Le
(74) *Attorney, Agent, or Firm* — Pearne & Gordon LLP

(57) ABSTRACT

To provide a mobile communication terminal test device and a mobile communication terminal test method capable of enabling a tester to intuitively know a set transmission power variation. A mobile communication terminal test device 1 includes: a pseudo base station device 10 that transmits and receives a signal to and from a mobile communication terminal 5; a transmission power setting display processing unit 22 that generates an input screen for inputting the set values of the transmission power of the pseudo base station device 10 and a variation in the transmission power over time; an operation unit 31 that inputs the set values; a transmission power graph display processing unit 23 that generates a graph indicating the variation in the transmission power over time using the set values; and a display unit 33 that displays the graph.

10 Claims, 9 Drawing Sheets

MOBILE COMMUNICATION TERMINAL TEST DEVICE AND MOBILE COMMUNICATION TERMINAL TEST METHOD

TECHNICAL FIELD

The present invention relates to a mobile communication terminal test device and a mobile communication terminal test method that test mobile communication terminals, such as mobile phones or mobile terminals.

BACKGROUND ART

For example, Patent Document 1 discloses this type of mobile communication terminal test device. The mobile communication terminal test device includes two pseudo base station units that transmit and receive signals to and from a mobile communication terminal, which is a test target, and simulate base stations, a transmission state setting unit that sets the transmission state of each pseudo base station unit, and an operation unit including, for example, a keyboard. According to this structure, the mobile communication terminal test device according to the related art disclosed in Patent Document 1 can perform a transmission test for the mobile communication terminal according to the test conditions set by the operation of the operation unit by the tester.

For example, in the mobile communication terminal test device according to the related art, when the handover test is performed, the tester operates the operation unit to input numerical data for setting a variation in transmission power over time (hereinafter, referred to as a "transmission power variation") to the two pseudo base station units. As a result, the mobile communication terminal test device according to the related art gradually reduces the transmission power of one of the pseudo base station units and gradually increases the transmission power of the other pseudo base station unit, thereby performing the handover test for the mobile communication terminal.

RELATED ART DOCUMENT

Patent Document

[Patent Document 1] JP-A-2010-136341 (Family U.S. Patent Application Publication: US 2010/0120371 A1)

DISCLOSURE OF THE INVENTION

Problem that the Invention is to Solve

However, in the mobile communication terminal test device according to the related art, since the tester operates the operation unit to input numerical data for setting the transmission power variation, errors in the setting of the transmission power variation are likely to occur. Therefore, in the mobile communication terminal test device according to the related art, it is necessary to input correct numerical data again and test the mobile communication terminal again.

The invention has been made in view of the above-mentioned problems and an object of the invention is to provide a mobile communication terminal test device and a mobile communication terminal test method capable of enabling the tester to intuitively know the set transmission power variation and preventing errors in the setting of a transmission power variation.

Means for Solving Problem

A mobile communication terminal test device according to a first aspect of the invention includes: a pseudo base station device (10) that transmits and receives a signal to and from a mobile communication terminal (5), which is a test target, and simulates a base station; input screen generating means (22, 41, 72) that generates an input screen (110, 140, 170) capable of inputting a set value for varying transmission power of the signal transmitted by the pseudo base station device over time; an operation unit (31) that inputs the set value through the input screen; graph generating means (23) that generates a graph (120, 150, 180) indicating a variation in the transmission power over time using the set value input from the operation unit; and a display unit (33) that displays the input screen and the graph.

According to this structure, the mobile communication terminal test device according to the first aspect of the invention includes the graph generating means that generates the graph indicating the variation in the transmission power over time using the set value input by the operation unit and the display unit that displays the graph. Therefore, the mobile communication terminal test device enables the tester to intuitively know the set transmission power variation and can prevent errors in the setting of the transmission power variation.

According to a second aspect of the invention, in the mobile communication terminal test device, the input screen generating means (22) may generate an input screen (110) for inputting transmission power before the variation, transmission power after the variation, and a transmission power variation per predetermined unit time as the set values. The operation unit may input the set values of the transmission power before the variation, the transmission power after the variation, and the transmission power variation per predetermined unit time. According to this structure, the mobile communication terminal test device according to the second aspect of the invention enables the tester to intuitively know the set transmission power variation and can prevent errors in the setting of the transmission power variation.

According to a third aspect of the invention, in the mobile communication terminal test device, the input screen generating means (41) may generate an input screen (140) for inputting the set values of the transmission power of each of a plurality of change points (P1 to P4) where the transmission power varies over time and a time interval between the change points. The operation unit may input the set values of the number of change points, the transmission power of each of the plurality of change points, and the time interval between the change points. The mobile communication terminal test device may further include change point setting means (42) that directs the graph generating means to generate a graph to which each set value related to the change points input by the operation unit is applied.

According to this structure, even when there are a plurality of change points where transmission power is varied over time, the mobile communication terminal test device according to the third aspect of the invention can display the graph such that the tester can intuitively know the set transmission power variation, and can prevent errors in the setting of the transmission power variation.

According to a fourth aspect of the invention, the mobile communication terminal test device may include the pseudo base station device according to the first aspect as a first pseudo base station device (50) and further include a second pseudo base station device (60) that is provided separately from the first pseudo base station device. The input screen generating means (72) may generate an input screen (170) for inputting a first set value for varying the transmission power of the first pseudo base station device from a first transmission power level to a second transmission power level over time and a second set value for varying the transmission power of the second pseudo base station device from the second transmission power level to the first transmission power level over time. The operation unit may input the first set value set to the first pseudo base station device and the second set value set to the second pseudo base station device. The mobile communication terminal test device may further include transmission power setting means (71) that sets the first set value input by the operation unit to the first pseudo base station device and sets the second set value input by the operation unit to the second pseudo base station device.

According to this structure, even when the handover test is performed, the mobile communication terminal test device according to the fourth aspect of the invention can display the graph such that the tester can intuitively know the set transmission power variation, and can prevent errors in the setting of the transmission power variation.

According to a fifth aspect of the invention, in the mobile communication terminal test device, when the operation unit inputs the first set value for varying the transmission power of the first pseudo base station device from the first transmission power level to the second transmission power level, the transmission power setting means may determine a set value for varying the transmission power of the second pseudo base station device from the second transmission power level to the first transmission power level to be the second set value, set the first set value input by the operation unit to the first pseudo base station device, and set the determined second set value to the second pseudo base station device.

According to this structure, the mobile communication terminal test device according to the fifth aspect of the invention can simplify the input of data in the handover test.

According to a sixth aspect of the invention, there is provided a mobile communication terminal test method that tests a mobile communication terminal (5), which is a test target, in a mobile communication terminal test device including a pseudo base station device (10) which transmits and receives a signal to and from the mobile communication terminal and simulates a base station. The mobile communication terminal test method includes: an input screen display step (S12, S22, S32) of displaying an input screen for inputting a set value for varying transmission power of the pseudo base station device over time; a set value input step (S13, S23, S33, S34) of inputting the set value; a graph generating step (S14, S26, S35) of generating a graph indicating a variation in the transmission power over time using the set value input in the set value input step; and a display step (S15, S27, S36) of displaying the graph.

According to this structure, the mobile communication terminal test method according to the sixth aspect of the invention includes the graph generating step of generating the graph indicating the variation in the transmission power over time using the set value input in the set value input step and the display step of displaying the graph. Therefore, the mobile communication terminal test method enables the tester to intuitively know the set transmission power variation and can prevent errors in the setting of the transmission power variation.

According to a seventh aspect of the invention, in the mobile communication terminal test method, the input screen display step (S12) may display an input screen (110) for inputting transmission power before the variation, transmission power after the variation, and a transmission power variation per predetermined unit time as the set values. The set value input step (S13) may input the set values of the transmission power before the variation, the transmission power after the variation, and the transmission power variation per predetermined unit time.

According to this structure, the mobile communication terminal test method according to the seventh aspect of the invention enables the tester to intuitively know the set transmission power variation and can prevent errors in the setting of the transmission power variation.

According to an eighth aspect of the invention, in the mobile communication terminal test method, the input screen generating step (S22) may display an input screen (140) for inputting the transmission power of each of a plurality of change points where the transmission power is varied over time and a time interval between the change points. The set value input step (S23) may input the set values of the transmission power of each of the plurality of change points and the time interval between the change points. The mobile communication terminal test method may further include change point setting step (S24, S25) of setting data for the transmission power of each of the plurality of change points and the time interval between the change points to the graph generated in the graph generating step (S26).

According to this structure, even when there are a plurality of change points where transmission power is varied over time, the mobile communication terminal test method according to the eighth aspect of the invention can display the graph such that the tester can intuitively know the set transmission power variation, and can prevent errors in the setting of the transmission power variation.

According to a ninth aspect of the invention, in the mobile communication terminal test method, the mobile communication terminal test device may include the pseudo base station device according to the sixth aspect as a first pseudo base station device (50) and further include a second pseudo base station device (60) that is provided separately from the first pseudo base station device. The input screen display step (S32) may generate an input screen (170) for inputting a first set value for varying the transmission power of the first pseudo base station device from a first transmission power level to a second transmission power level over time and a second set value for varying the transmission power of the second pseudo base station device from the second transmission power level to the first transmission power level over time. The set value input step (S33, S34) may input the first set value set to the first pseudo base station device and the second set value set to the second pseudo base station device. The mobile communication terminal test method may further include a transmission power setting step (S37) of setting the first set value input in the set value input step to the first pseudo base station device and set the second set value input in the set value input step to the second pseudo base station device.

According to this structure, even when the handover test is performed, the mobile communication terminal test method according to the ninth aspect of the invention can display the graph such that the tester can intuitively know the set transmission power variation, and can prevent errors in the setting of the transmission power variation.

According to a tenth aspect of the invention, in the mobile communication terminal test method, when the first set value for varying the transmission power of the first pseudo base station device from the first transmission power level to the second transmission power level is input in the set value input step (S33, S34), a set value for varying the transmission power of the second pseudo base station device from the second transmission power level to the first transmission power level may be determined to be the second set value. The transmission power setting step may set the first set value input in the set value input step to the first pseudo base station device and set the determined second set value to the second pseudo base station device.

According to this structure, the mobile communication terminal test method according to the tenth aspect of the invention can simplify the input of data in the handover test.

Advantage of the Invention

The invention provides a mobile communication terminal test device and a mobile communication terminal test method capable of enabling the tester to intuitively know a set transmission power variation and preventing errors in the setting of a transmission power variation.

BEST MODE FOR CARRYING OUT THE INVENTION

Hereinafter, embodiments of the invention will be described with reference to the accompanying drawings.

(First Embodiment)

First, the structure of a mobile communication terminal test device according to a first embodiment of the invention will be described.

Figure 1:
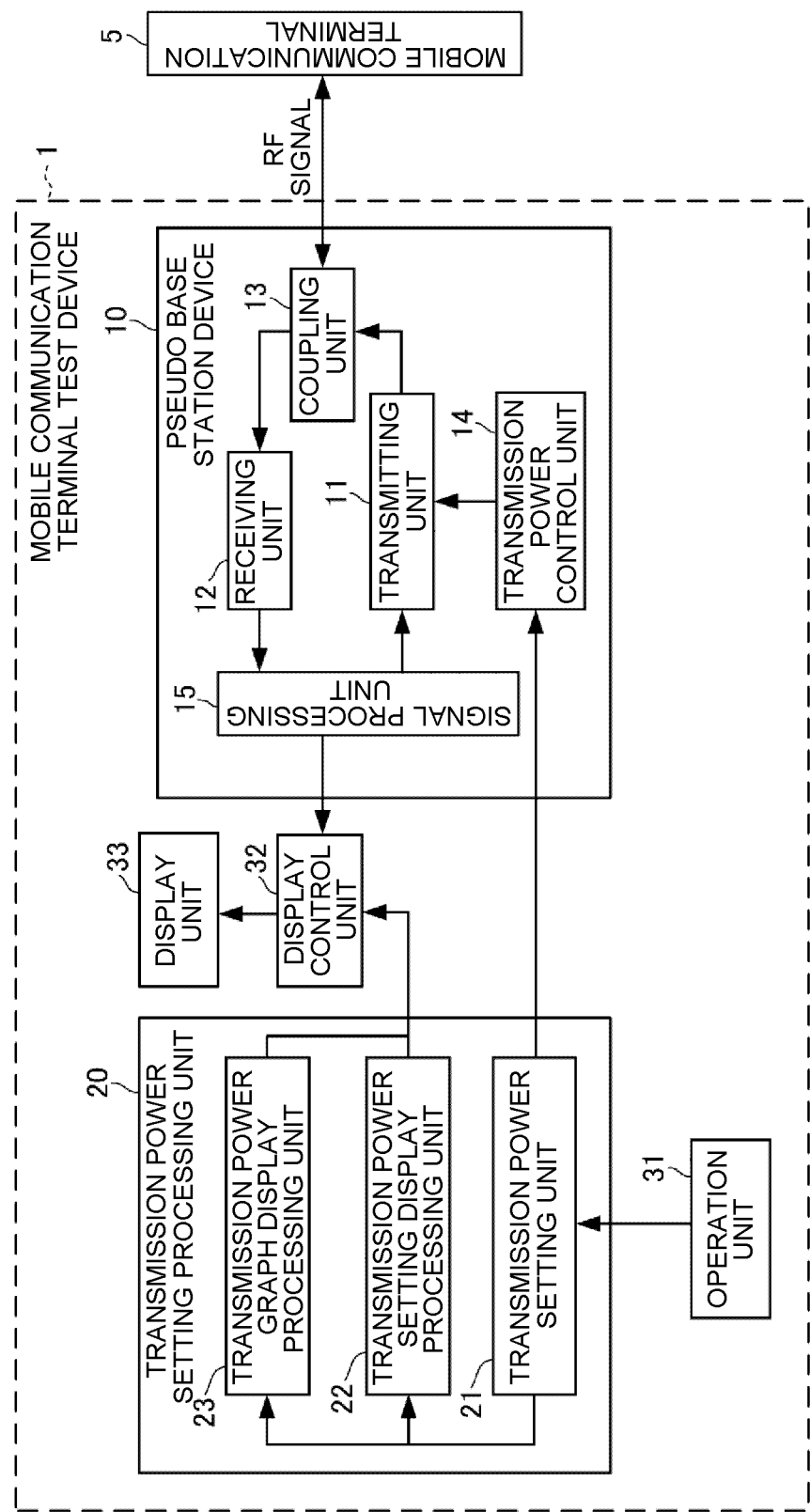
FIG. 1 is a block diagram illustrating a mobile communication terminal test device according to a first embodiment of the invention.

As shown in FIG. 1, a mobile communication terminal test device 1 according to this embodiment tests a mobile communication terminal 5 and includes a pseudo base station device 10, a transmission power setting processing unit 20, an operation unit 31, a display control unit 32, and a display unit 33.

The pseudo base station device 10 includes a transmitting unit 11, a receiving unit 12, a coupling unit 13, a transmission power control unit 14, and a signal processing unit 15.

The transmitting unit 11 modulates a carrier wave with a frequency designated by the signal processing unit 15 using a predetermined modulation method and outputs the carrier wave as a base station signal to the coupling unit 13.

The receiving unit 12 receives a signal from a mobile communication terminal 5 to be tested through the coupling unit 13.

The coupling unit 13 outputs the signal transmitted from the transmitting unit 11 to the mobile communication terminal 5 and outputs the signal transmitted from the mobile communication terminal 5 to the receiving unit 12.

The transmission power control unit 14 controls the transmission power of the base station signal output from the transmitting unit 11 so as to be equal to transmission power set by the transmission power setting unit 21, which will be described below.

The signal processing unit 15 includes a memory which stores data for the sequence of each test for the mobile communication terminal 5, which is a test target, in advance. The tester operates the operation unit 31, which will be described below, to set the test sequence. The signal processing unit 15 controls the operation of the transmitting unit 11, the receiving unit 12, and the coupling unit 13 on the basis of the test sequence and outputs the messages transmitted and received by the transmitting unit 11 and the receiving unit 12 to the display control unit 32.

The transmission power setting processing unit 20 includes a transmission power setting unit 21, a transmission power setting display processing unit 22, and a transmission power graph display processing unit 23.

The transmission power setting unit 21 sets the transmission power of the base station signal output from the transmitting unit 11 on the basis of transmission power data which is input from the operation unit 31 through, for example, a GUI (Graphical User Interface).

The transmission power setting display processing unit 22 generates screen data for displaying a GUI screen for inputting the set transmission power data on a screen of the display unit 33 and outputs the screen data to the display control unit 32. The transmission power setting display processing unit 22 forms input screen generating means according to the invention.

The transmission power graph display processing unit 23 generates screen data for displaying a set value display graph indicating the set value of the transmission power on the screen of the display unit 33 and outputs the screen data to the display control unit 32. The transmission power graph display processing unit 23 forms graph generating means according to the invention.

The operation unit 31 is operated by the tester and includes an input device, such as a keyboard, a dial, or a mouse, and a control circuit which controls the input device in order to set, for example, test conditions including transmission power in the uplink or downlink and data for designating a variation in transmission power over time and settings for the test sequence. The operation unit 31 forms set value input means according to the invention.

The operation unit 31 may be used by the tester to select the test mode. Examples of the test mode selected by the tester include a mode which tests the mobile communication terminal 5 using general communication with the mobile communication terminal 5 (hereinafter, referred to as "a normal communication test mode"), a battery life test mode which mainly tests the battery life of the mobile communication terminal 5, and a handover test mode which directs the mobile communication terminal 5 to change the base station.

The display control unit 32 controls displaying data such that, for example, various messages from the signal processing unit 15 and the screen data generated by the transmission power setting display processing unit 22 and the transmission power graph display processing unit 23 are displayed on the screen of the display unit 33.

Figure 2:
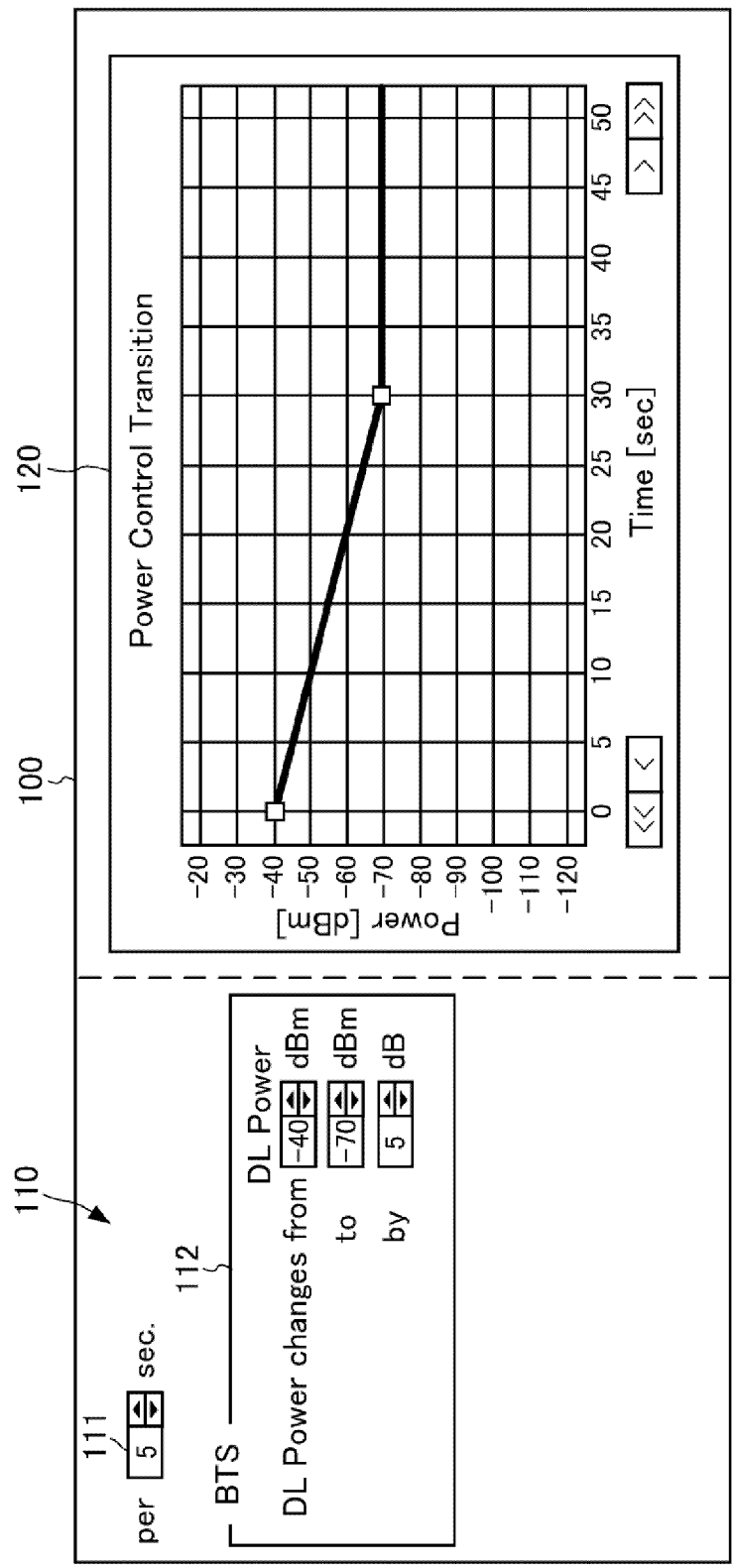
FIG. 2 is a diagram illustrating an example of a transmission power setting screen displayed on a display unit in the mobile communication terminal test device according to the first embodiment of the invention.

The display unit 33 is, for example, a liquid crystal display and displays various messages from the signal processing unit 15, a transmission power setting screen, and a transmission power graph under the control of the display control unit 32. The display unit 33 forms display means according to the invention. FIG. 2 shows an example of the transmission power setting screen displayed on the display unit 33.

In FIG. 2, a transmission power setting screen 100 displayed on the display unit 33 includes a set value input screen 110 which inputs the set value of transmission power and a set value display graph screen 120 which shows a transmission power variation as a graph. On the set value input screen 110, the GUI screen generated by the transmission power setting display processing unit 22 is displayed by the display unit 33. On the set value display graph screen 120, the graph generated by the transmission power graph display processing unit 23 is displayed by the display unit 33.

The set value input screen 110 includes a time setting portion 111 for setting a temporal element of the transmission power variation and a transmission power variation setting portion 112 for setting a variation in transmission power in the downlink from the pseudo base station device 10 to the mobile communication terminal 5. The transmission power variation setting portion 112 includes three data input windows (reference numerals are omitted) such that transmission power before a variation, transmission power after a variation, and a variation in transmission power are set. In the example shown in FIG. 2, a temporal variation is set in which transmission power (DL Power) in the downlink is varied from −40 dBm to −70 dBm at a rate of 5 dB per 5 seconds. The transmission power may be set in the uplink in the same way as described above.

On the set value display graph screen 120, the set value of the transmission power set by the set value input screen 110 is displayed as a graph in which the horizontal axis is time (seconds) and the vertical axis is transmission power (dBm). The tester views the set value display graph screen 120 of the mobile communication terminal test device 1 to intuitively know a variation in the set transmission power. Therefore, the mobile communication terminal test device 1 enables the tester to easily determine whether there are errors in the setting of the transmission power. In this way, it is possible to prevent errors in the setting of the transmission power variation.

Figure 3:
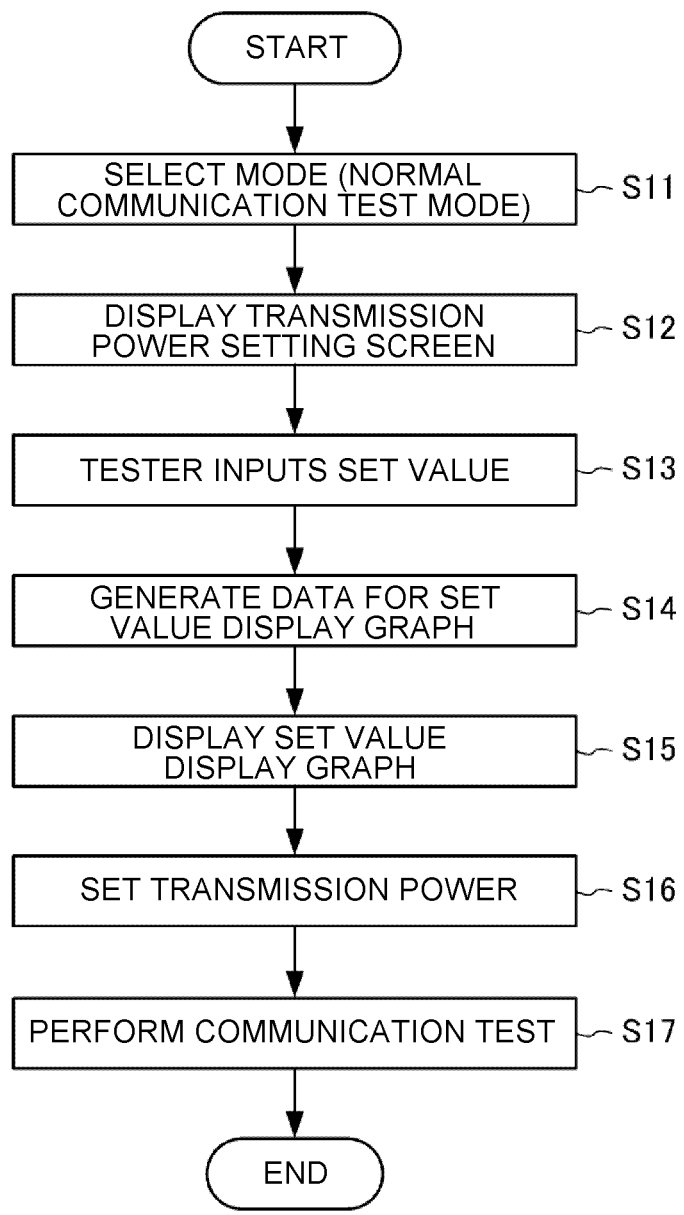
FIG. 3 is a flowchart illustrating the operation of the mobile communication terminal test device according to the first embodiment of the invention.

Next, the operation of the mobile communication terminal test device 1 according to this embodiment will be described with reference to FIG. 3.

The tester operates the operation unit 31 to select the test mode (Step S11). It is assumed that the normal communication test mode is selected.

The transmission power setting display processing unit 22 generates screen data for the transmission power setting screen 100 and outputs the screen data to the display control unit 32. The display unit 33 displays the transmission power setting screen 100 (Step S12). The displayed transmission power setting screen 100 includes the set value input screen 110 and the set value display graph screen 120 (no graph is displayed).

The tester operates the operation unit 31 to input the set value of transmission power on the set value input screen 110 (Step S13).

The transmission power graph display processing unit 23 generates screen data for the set value display graph screen 120 on the basis of the set value of transmission power input through the set value input screen 110 (Step S14). In addition, the transmission power graph display processing unit 23 outputs the generated data to the display control unit 32 and the display unit 33 displays the set value display graph screen 120 on which a graph is displayed (Step S15).

The tester checks the set value display graph screen 120. When there is no error in the set value and the tester operates the operation unit 31, the transmission power setting unit 21 sets transmission power (Step S16) and the communication test is performed on the normal communication test mode (Step S17).

As described above, the mobile communication terminal test device 1 according to this embodiment includes the transmission power graph display processing unit 23 that displays the set value of transmission power as a graph. Therefore, the tester can intuitively know the set transmission power variation and it is possible to prevent errors in the setting of the transmission power variation.

(Second Embodiment)

First, the structure of a mobile communication terminal test device according to a second embodiment of the invention will be described.

Figure 4:
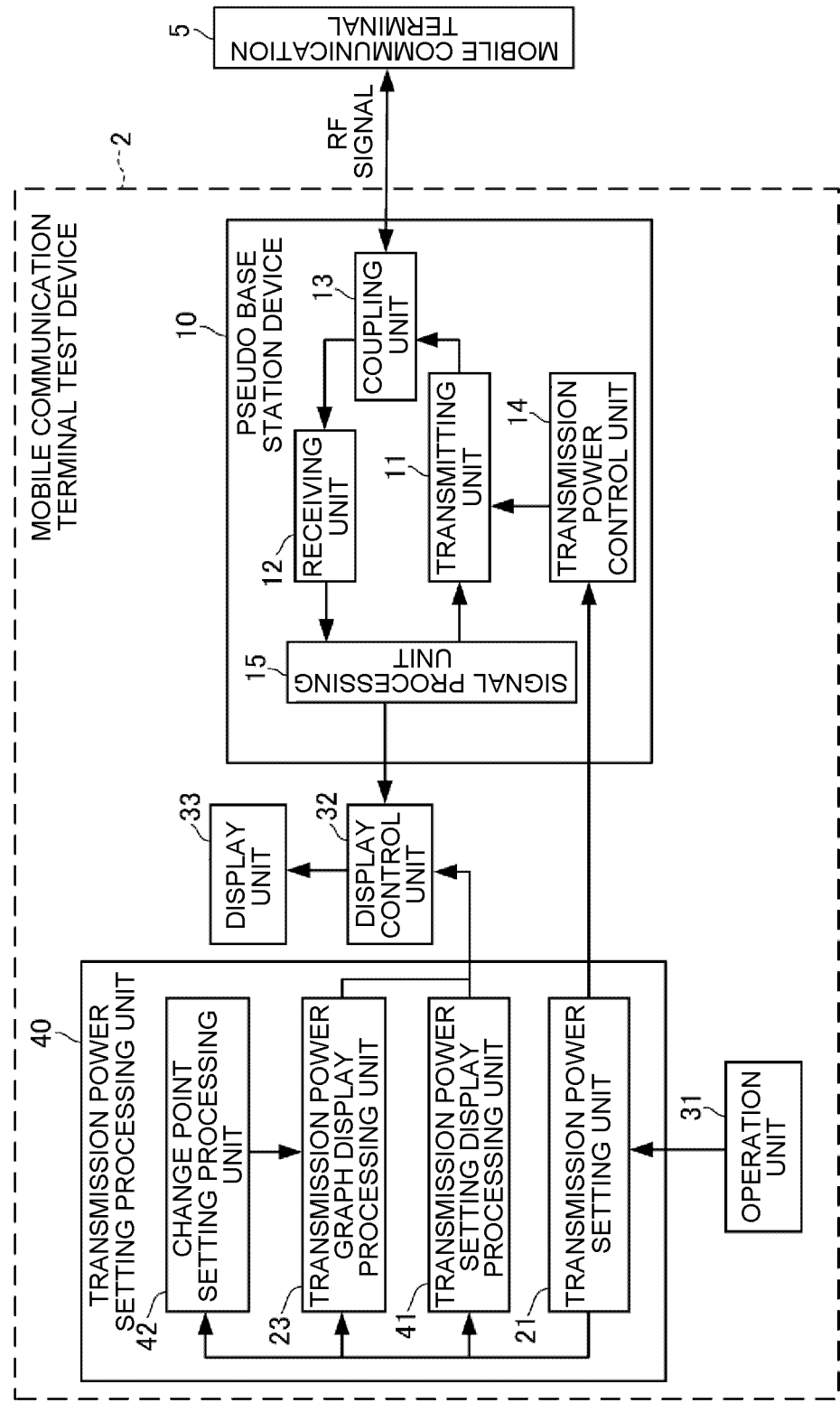
FIG. 4 is a block diagram illustrating a mobile communication terminal test device according to a second embodiment of the invention.

As shown in FIG. 4, a mobile communication terminal test device 2 according to this embodiment differs from the mobile communication terminal test device 1 (see FIG. 1) according to the first embodiment in that it includes a transmission power setting processing unit 40 instead of the transmission power setting processing unit 20. Therefore, the description of the same components as those in the first embodiment will not be repeated.

The transmission power setting processing unit 40 includes a transmission power setting display processing unit 41 and a change point setting processing unit 42.

The transmission power setting display processing unit 41 generates screen data for displaying a GUI screen for inputting transmission power set data on the screen of a display unit 33 and outputs the screen data to a display control unit 32. The transmission power setting display processing unit 41 forms input screen generating means according to the invention.

When the transmission power of a base station signal output from a transmitting unit 11 is varied over time to test a mobile communication terminal 5, the change point setting processing unit 42 sets information for instructing a transmission power graph display processing unit 23 to generate a graph including transmission power change points whose number is set by a change point number increasing and decreasing portion 141, which will be described below. The change point setting processing unit 42 forms change point setting means according to the invention.

Figure 5:
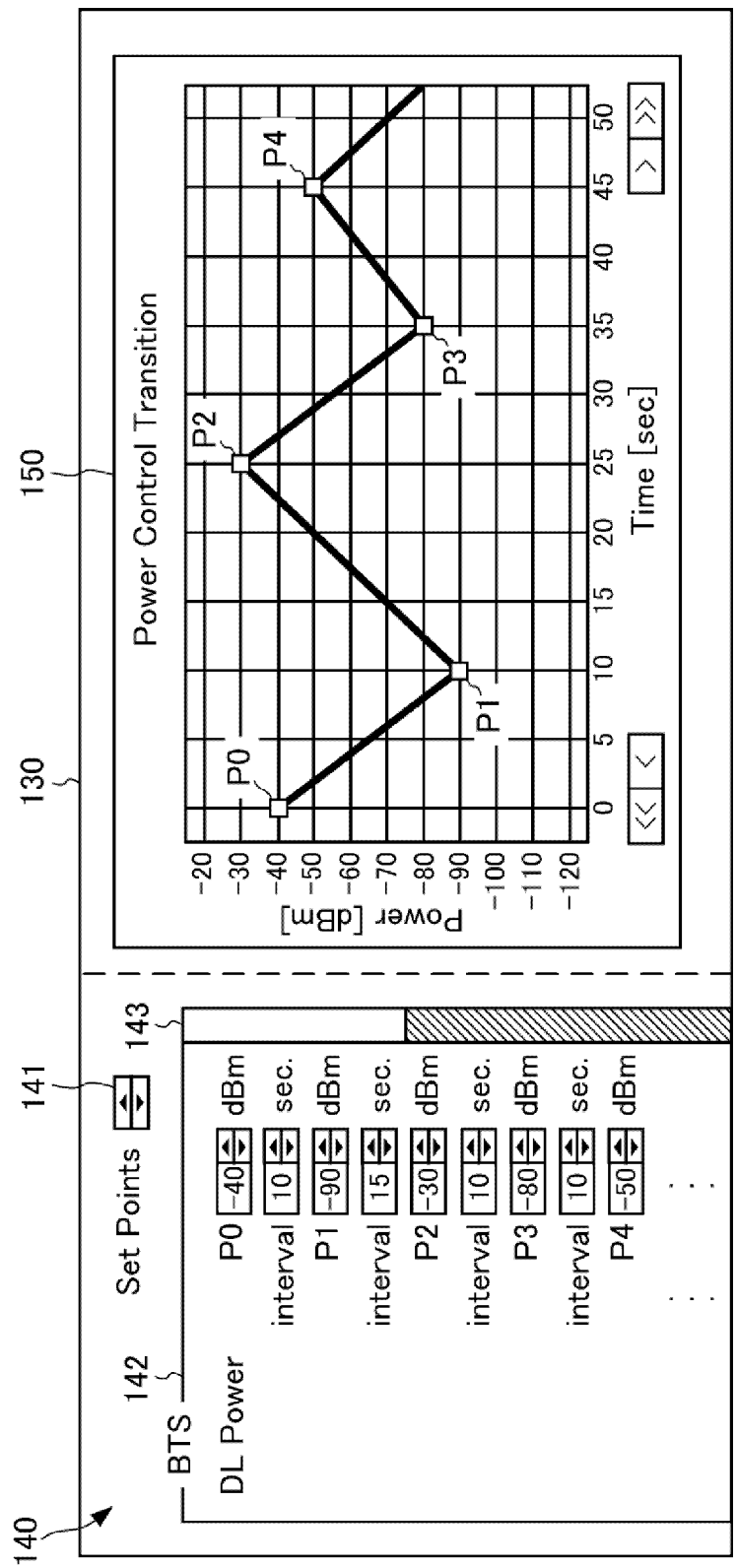
FIG. 5 is a diagram illustrating an example of a transmission power setting screen displayed on a display unit in the mobile communication terminal test device according to the second embodiment of the invention.

FIG. 5 shows a transmission power setting screen 130 displayed by the display unit 33 according to this embodiment. The transmission power setting screen 130 includes a set value input screen 140 which inputs the set value of transmission power and a set value display graph screen 150 which displays a transmission power variation. On the set value input screen 140, the GUI screen generated by the transmission power setting display processing unit 41 is displayed by the display unit 33. On the set value display graph screen 150, the graph which is generated by the transmission power graph display processing unit 23 on the basis of the input information about the change points set by the change point setting processing unit 42 is displayed on the display unit 33.

The set value input screen 140 includes the change point number increasing and decreasing portion 141 which increases and decreases the number of transmission power change points. In addition, the set value input screen 140 includes a change point setting portion 142 including a transmission power value input window for inputting each transmission power change point in the downlink from a pseudo base station device 10 to the mobile communication terminal 5 and a time interval input window for setting the time interval (interval) of each change point. Furthermore, the set value input screen 140 includes a slider 143 which scrolls the screen display of the change point setting portion 142.

The transmission power setting display processing unit 41 increases or decreases the number of transmission power value input windows and time interval input windows displayed in the change point setting portion 142 according to the value increased or decreased by the change point number increasing and decreasing portion 141.

In the example shown in FIG. 5, the transmission power set value at a reference point P0 is set to −40 dBm, the transmission power set value at a first change point P1 is set to −90 dBm, and the time interval between the reference point P0 and the first change point P1 is set to 10 seconds.

On the set value display graph screen 150, the set value of the transmission power set by the set value input screen 140 is displayed as a graph in which the horizontal axis is time (second) and the vertical axis is transmission power (dBm). The mobile communication terminal test device 2 enables the tester to view the set value display graph screen 150 such that the tester can intuitively know the set transmission power variation. Therefore, the mobile communication terminal test device 2 enables the tester to easily determine whether there are errors in the setting of transmission power and can prevent errors in the setting of a transmission power variation.

In this embodiment, it is assumed that the mobile communication terminal 5 increases or decreases the transmission power in the uplink according to transmission power in the downlink. In this case, when transmission power in the downlink is decreased, the mobile communication terminal 5 increases transmission power in the uplink. When transmission power in the downlink is increased, the mobile communication terminal 5 decreases transmission power in the downlink. Therefore, the test according to this embodiment is suitable as the battery life test for the mobile communication terminal 5.

Figure 6:
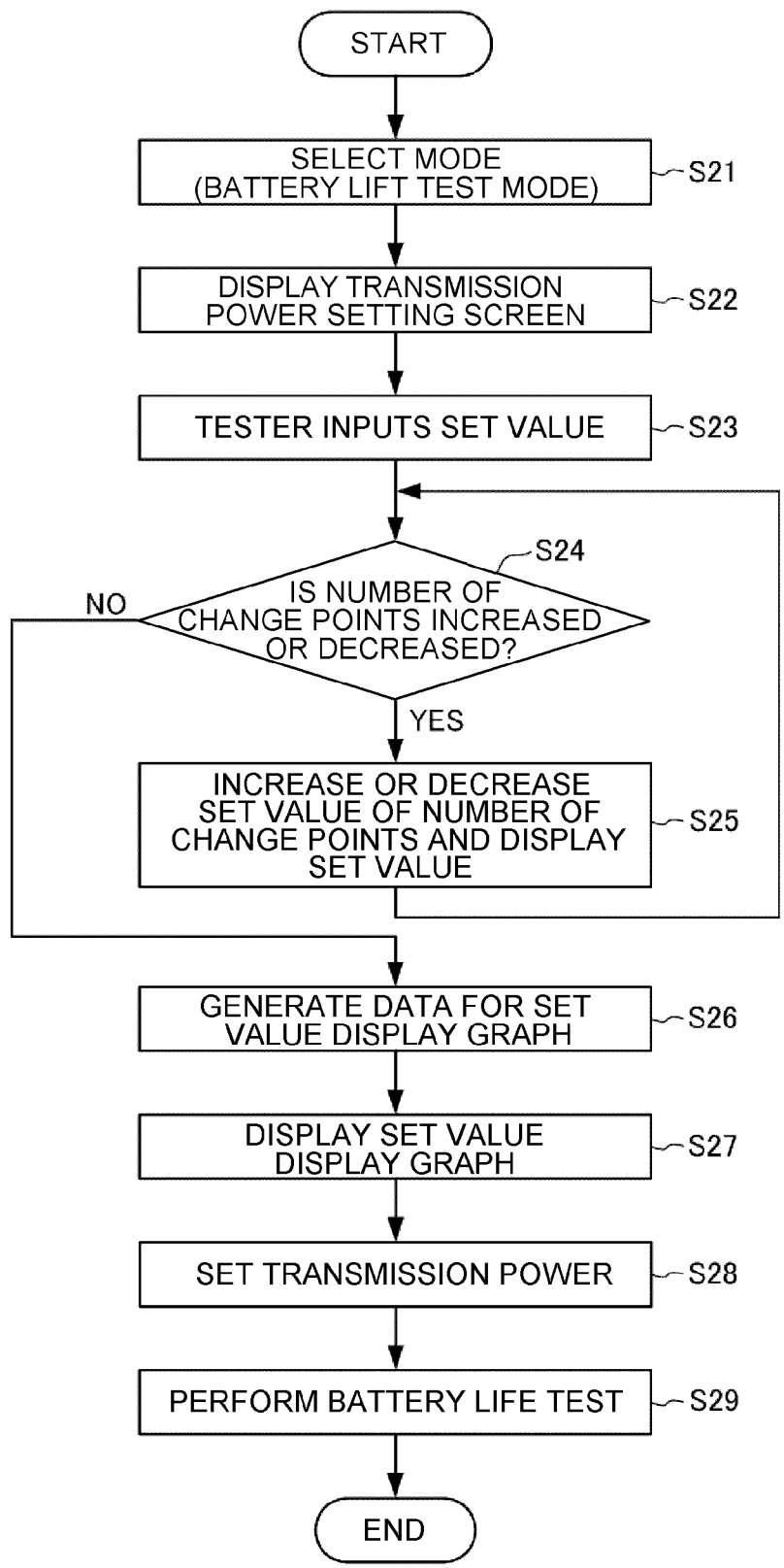
FIG. 6 is a flowchart illustrating the operation of the mobile communication terminal test device according to the second embodiment of the invention.

Next, the operation of the mobile communication terminal test device 2 according to this embodiment will be described with reference to FIG. 6.

The tester operates the operation unit 31 to select the test mode (Step S21). It is assumed that the battery life test mode is selected.

The transmission power setting display processing unit 41 generates screen data for the transmission power setting screen 130 and outputs the screen data to the display control unit 32, and the display unit 33 displays the transmission power setting screen 130 (Step S22). The displayed transmission power setting screen 130 includes the set value input screen 140 and the set value display graph screen 150 (no graph is displayed).

The tester operates the operation unit 31 to input the set value of transmission power on the set value input screen 140 (Step S23).

The transmission power setting display processing unit 41 determines whether the number of change points is increased or decreased by the operation of the change point number increasing and decreasing portion 141 (Step S24).

When it is determined in Step S24 that the number of change points is increased or decreased, the transmission power setting display processing unit 41 increases or decreases the number of transmission power value input windows and time interval input windows displayed (Step S25). That is, when it is determined that the number of change points is increased, the transmission power setting display processing unit 41 increases the number of transmission power value input windows and time interval input windows displayed according to the set value of the change point number increasing and decreasing portion 141. When it is determined that the number of change points is decreased, the transmission power setting display processing unit 41 decreases the number of transmission power value input windows and time interval input windows displayed according to the set value of the change point number increasing and decreasing portion 141. When the number of change points is increased, the tester inputs the set values of the transmission power and the time interval to the increased change points using the operation unit 31.

On the other hand, when it is not determined in Step S24 that the number of change points is increased or decreased, the transmission power graph display processing unit 23 generates screen data for the set value display graph screen 150 on the basis of the set value of the transmission power input through the set value input screen 140 (Step S26). In addition, the transmission power graph display processing unit 23 outputs the generated screen data to the display control unit 32 and the display unit 33 displays the set value display graph screen 150 (Step S27).

The tester checks the set value display graph screen 150. When there is an error in the set value and the tester operates the operation unit 31, the transmission power setting unit 21 sets transmission power (Step S28) and the battery life test is performed (Step S29).

As described above, the mobile communication terminal test device 2 according to this embodiment includes the change point setting processing unit 42 which sets a plurality of change points where transmission power is varied over time using the change point number increasing and decreasing portion 141 and directs the transmission power graph display processing unit 23 to generate a graph including the plurality of change points. Therefore, even when there are a plurality of change points where transmission power is varied over time, the graph is displayed such that the tester can intuitively know the set transmission power variation and it is possible to prevent errors in the setting of a transmission power variation.

(Third Embodiment)

First, the structure of a mobile communication terminal test device according to a third embodiment of the invention will be described.

Figure 7:
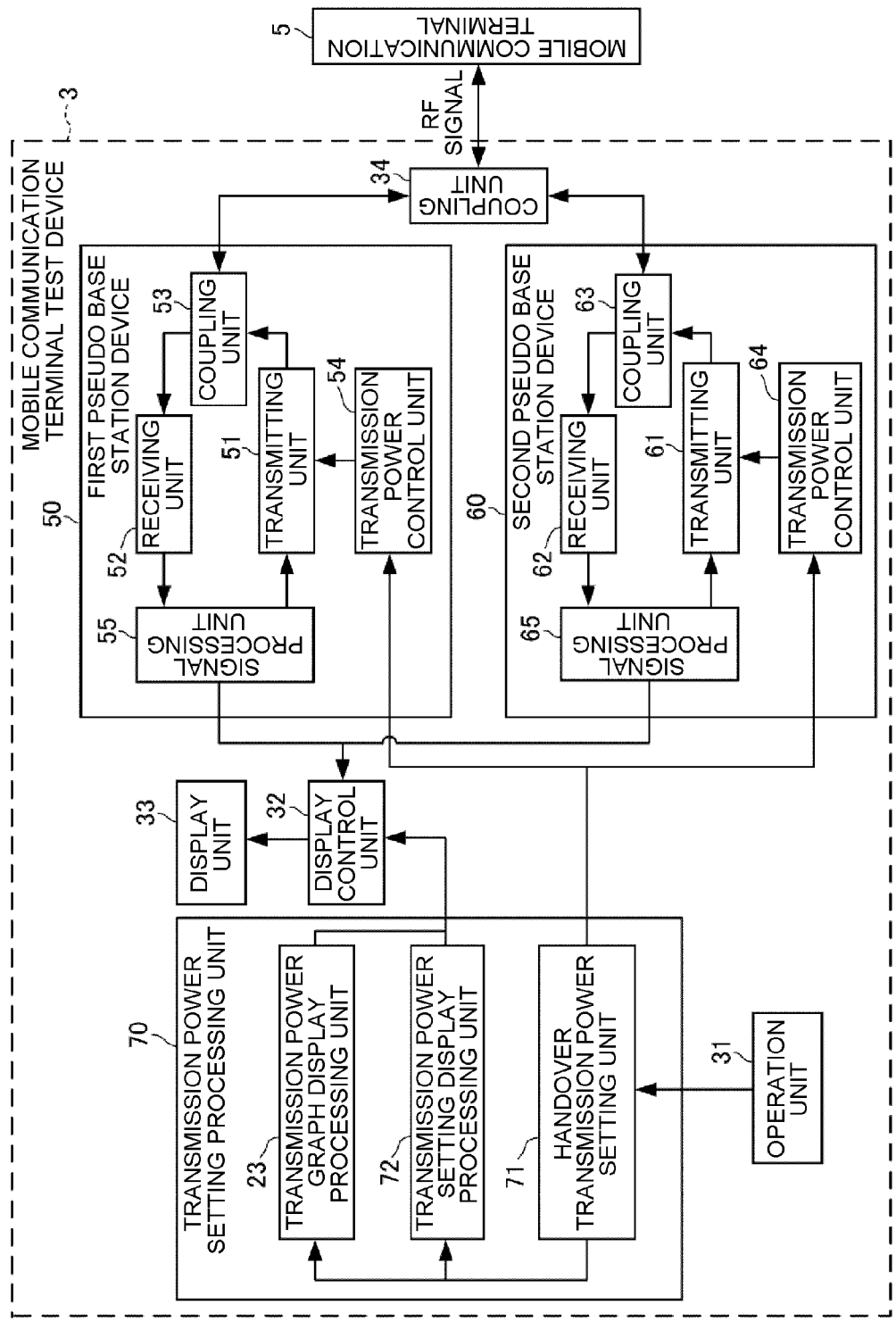
FIG. 7 is a block diagram illustrating a mobile communication terminal test device according to a third embodiment of the invention.

As shown in FIG. 7, a mobile communication terminal test device 3 according to this embodiment differs from the mobile communication terminal test device 1 (see FIG. 1) according to the first embodiment in that it includes a transmission power setting processing unit 70 instead of the transmission power setting processing unit 20 and includes two pseudo base station devices. Therefore, the description of the same components as those in the first embodiment will not be repeated.

The mobile communication terminal test device 3 includes a first pseudo base station device 50 and a second pseudo base station device 60 which correspond to two pseudo base station devices 10 according to the first embodiment.

The first pseudo base station device 50 includes a transmitting unit 51, a receiving unit 52, a coupling unit 53, a transmission power control unit 54, and a signal processing unit 55. The second pseudo base station device 60 includes a transmitting unit 61, a receiving unit 62, a coupling unit 63, a transmission power control unit 64, and a signal processing unit 65.

The transmission power setting processing unit 70 includes a handover transmission power setting unit 71 and a transmission power setting display processing unit 72.

The handover transmission power setting unit 71 varies the transmission power of a base station signal output from the transmitting unit 51 of the first pseudo base station device 50 and the transmission power of a base station signal output from the transmitting unit 61 of the second pseudo base station device 60 in parallel over time to set a transmission power value for testing a mobile communication terminal 5. The handover transmission power setting unit 71 forms transmission power setting means according to the invention.

The transmission power setting display processing unit 72 generates screen data for displaying a GUI screen for inputting transmission power set data for a handover test on the display unit 33 and outputs the screen data to the display control unit 32. The transmission power setting display processing unit 72 forms input screen generating means according to the invention.

Figure 8:
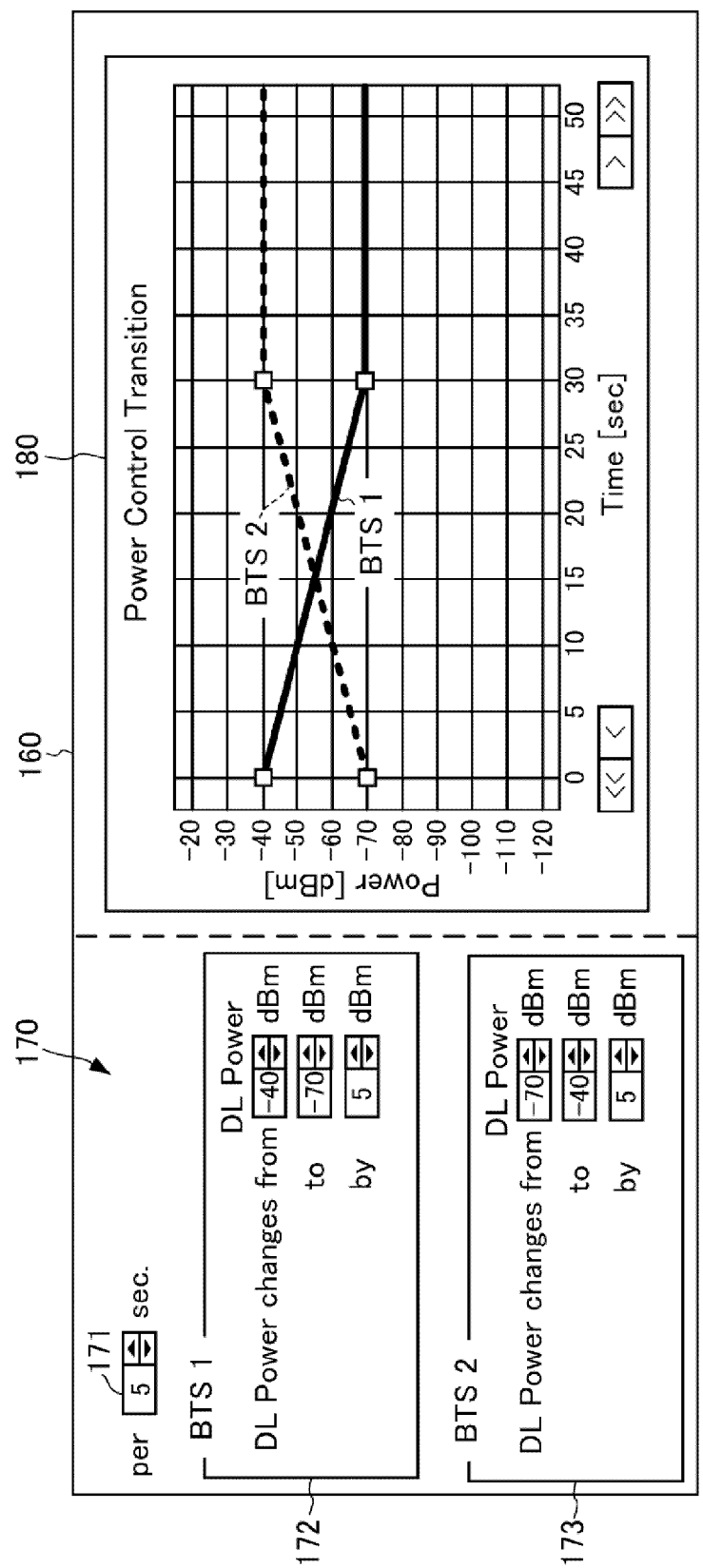
FIG. 8 is a diagram illustrating an example of a transmission power setting screen displayed on a display unit in the mobile communication terminal test device according to the third embodiment of the invention.

FIG. 8 shows a transmission power setting screen 160 displayed on the display unit 33 according to this embodiment. The transmission power setting screen 160 includes a set value input screen 170 for inputting the set value of transmission power and a set value display graph screen 180 for displaying a transmission power variation. On the set value input screen 170, the GUI screen generated by the transmission power setting display processing unit 72 is displayed by the display unit 33. On the set value display graph screen 180, the graph which is generated by a transmission power graph display processing unit 23 on the basis of information set by the handover transmission power setting unit 71 is displayed by the display unit 33.

The set value input screen 170 includes a temporal variation setting portion 171 for setting a transmission power variation, a transmission power variation setting portion 172 for setting the transmission power of the first pseudo base station device 50 (BTS1), and a transmission power variation setting portion 173 for setting the transmission power of the second pseudo base station device 60 (BTS2).

When the tester operates the operation unit 31 to set the value of the transmission power variation setting portion 172, the handover transmission power setting unit 71 determines the set value of the transmission power variation setting portion 173 on the basis of the set value. In the example shown in FIG. 8, when the transmission power before handover is set to −40 dBm, the transmission power after handover is set to −70 dBm, and a transmission power variation is set to 5 dB per 5 seconds in the transmission power variation setting portion 172, the handover transmission power setting unit 71 sets the transmission power before handover to −70 dBm, the transmission power after handover to −40 dBm, and the transmission power variation to 5 dB per 5 seconds in the transmission power variation setting portion 172.

The set value display graph screen 180 displays the value of the transmission power set by the set value input screen 170 as a graph in which the horizontal axis is time (second) and the vertical axis is transmission power (dBm). The mobile communication terminal test device 3 enables the tester to view the set value display graph screen 180 such that the tester can intuitively know the set transmission power variation. Therefore, the mobile communication terminal test device 3 enables the tester to easily determine whether there are errors in the setting of transmission power and can prevent errors in the setting of the transmission power variation.

Figure 9:
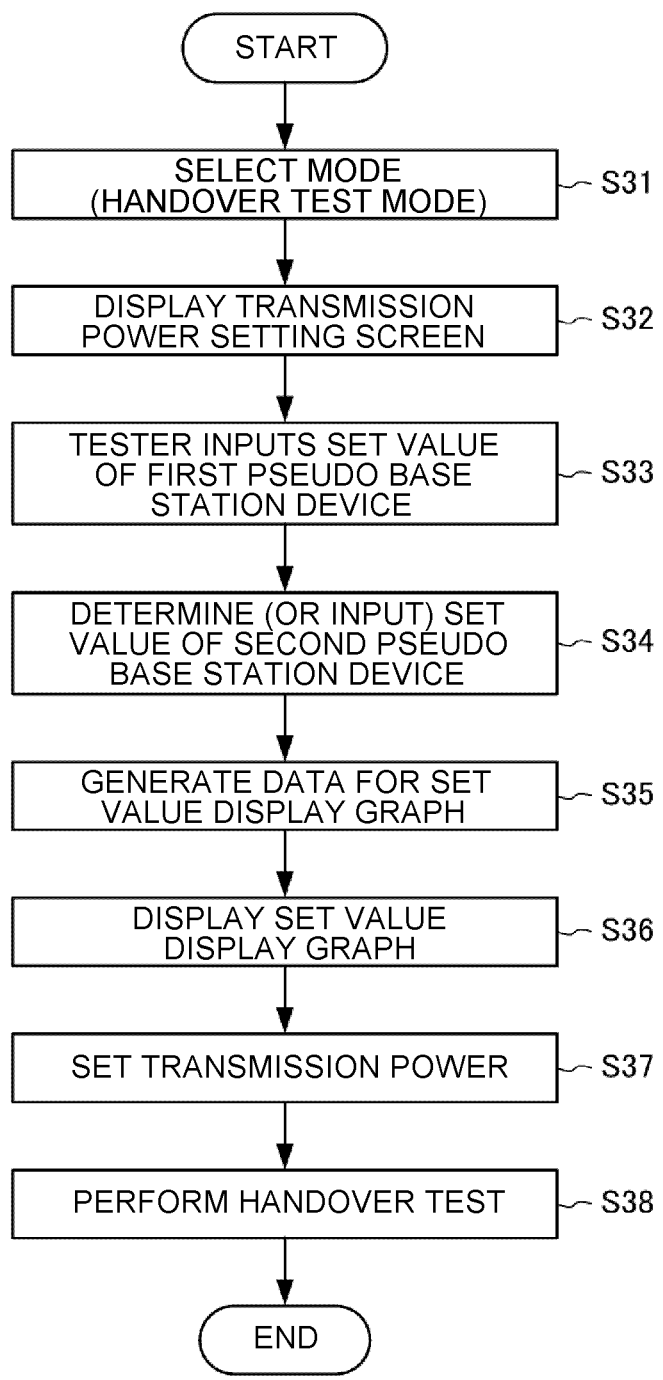
FIG. 9 is a flowchart illustrating the operation of the mobile communication terminal test device according to the third embodiment of the invention.

Next, the operation of the mobile communication terminal test device 3 according to this embodiment will be described with reference to FIG. 9.

The tester operates the operation unit 31 to select the test mode (Step S31). It is assumed that the handover test mode is selected.

The transmission power setting display processing unit 22 generates data for the transmission power setting screen 160 and outputs the data to the display control unit 32, and the display unit 33 displays the transmission power setting screen 160 (Step S32). The displayed transmission power setting screen 160 includes the set value input screen 170 and the set value display graph screen 180 (no graph is displayed).

The tester operates the operation unit 31 to input the set value of the temporal variation setting portion 171 and the set value of the transmission power of the transmission power variation setting portion 172, that is, the set value of the transmission power of the first pseudo base station device 50 (Step S33).

The handover transmission power setting unit 71 determines the set value of the transmission power variation setting portion 173, that is, the set value of the transmission power of the second pseudo base station device 60 on the basis of the set value of the transmission power in the transmission power variation setting portion 172 (Step S34) and the display unit 33 displays the set value on a data input window of the transmission power variation setting portion 173. In Step S34, the tester may operate the operation unit 31 to input the set value of the transmission power of the second pseudo base station device 60.

The transmission power graph display processing unit 23 generates screen data for the set value display graph screen 180 on the basis of the set value of the transmission power input through the set value input screen 170 (Step S35). In addition, the transmission power graph display processing unit 23 outputs the generated data to the display control unit 32 and the display unit 33 displays the set value display graph screen 180 (Step S36).

The tester checks the set value display graph screen 180. When there is no error in the set value and the tester operates the operation unit 31, the handover transmission power setting unit 71 sets the transmission power of each of the first pseudo base station device 50 and the second pseudo base station device 60 (Step S37) and the handover test is performed (Step S38).

As described above, the mobile communication terminal test device 3 according to this embodiment includes the transmission power graph display processing unit 23 which displays the set value of the transmission power as a graph in the handover test for the first pseudo base station device 50 and the second pseudo base station device 60. Therefore, in the handover test, the mobile communication terminal test device 3 enables the tester to intuitively know a set transmission power variation and can prevent errors in the setting of the transmission power variation.

In the above-described embodiment, the transmission power of the first pseudo base station device 50 is gradually decreased and the transmission power of the second pseudo base station device 60 is gradually increased. However, the decrease and increase in the transmission power may be reversed.

In the third embodiment, the structure of the set value input screen and the set value input sequence may be the same as the structure of the set value input screen and the set value input sequence in the second embodiment. That is, the set value input screen 170 shown in FIG. 8 may have the same structure as the set value input screen 140 shown in FIG. 5.

In the second embodiment, the operation unit 31 may be operated to move the reference point P0 and the change points P1, P2, . . . on the set value display graph screen 150, thereby setting the transmission power. In this case, the set value display graph screen 150 may also serve as the set value input screen 140. Specifically, the tester operates a mouse of the operation unit 31 to select the change point P1 and drags the selected change point P1 to set the positions of the reference point P0 and the change points P1, P2, . . . on the set value display graph screen 150. Then, the transmission power graph display processing unit 23 generates screen data for a graph in which pairs of the points, such as the reference point P0 and the change point P1, the change point P1 and the change point P2, . . . , are connected by straight lines. The transmission power setting unit 21 sets transmission power corresponding to the graph. This structure can also be applied to the third embodiment.

INDUSTRIAL APPLICABILITY

As described above, the mobile communication terminal test device and the mobile communication terminal test method according to the invention enable the tester to intuitively know a set transmission power variation and prevent errors in the setting of a transmission power variation. Therefore, the mobile communication terminal test device and the mobile communication terminal test method according to the invention are useful as a mobile communication terminal test device and a mobile communication terminal test method which test mobile communication terminals, such as mobile phones or mobile terminals.

DESCRIPTION OF REFERENCE NUMERALS AND SIGNS 1, 2, 3: MOBILE COMMUNICATION TERMINAL TEST DEVICE
5: MOBILE COMMUNICATION TERMINAL
10: PSEUDO BASE STATION DEVICE
11, 51, 61: TRANSMITTING UNIT
12, 52, 62: RECEIVING UNIT
13, 53, 63: COUPLING UNIT
14, 54, 64: TRANSMISSION POWER CONTROL UNIT
15, 55, 65: SIGNAL PROCESSING UNIT
20, 40, 70: TRANSMISSION POWER SETTING PROCESSING UNIT
21: TRANSMISSION POWER SETTING UNIT
22, 41, 72: TRANSMISSION POWER SETTING DISPLAY PROCESSING UNIT (INPUT SCREEN GENERATING MEANS)
23: TRANSMISSION POWER GRAPH DISPLAY PROCESSING UNIT (GRAPH GENERATING MEANS)
31: OPERATION UNIT (SET VALUE INPUT MEANS)
32: DISPLAY CONTROL UNIT
33: DISPLAY UNIT (DISPLAY MEANS)
42: CHANGE POINT SETTING PROCESSING UNIT (CHANGE POINT SETTING MEANS)
50: FIRST PSEUDO BASE STATION DEVICE
60: SECOND PSEUDO BASE STATION DEVICE
71: HANDOVER TRANSMISSION POWER SETTING UNIT (TRANSMISSION POWER SETTING MEANS)
100, 130, 160: TRANSMISSION POWER SETTING SCREEN
110, 140, 170: SET VALUE INPUT SCREEN
111: TIME SETTING PORTION
112: TRANSMISSION POWER VARIATION SETTING PORTION
120, 150, 180: SET VALUE DISPLAY GRAPH SCREEN
141: CHANGE POINT NUMBER INCREASING AND DECREASING PORTION
142: CHANGE POINT SETTING PORTION
143: SLIDER
171: TEMPORAL VARIATION SETTING PORTION
172: TRANSMISSION POWER VARIATION SETTING PORTION
173: TRANSMISSION POWER VARIATION SETTING PORTION

The invention claimed is:

1. A mobile communication terminal test device comprising:
a pseudo base station device that transmits and receives a signal to and from a mobile communication terminal, which is a test target, and simulates a base station;
input screen generating means that generates an input screen capable of inputting a set value for varying transmission power of the signal transmitted by the pseudo base station device over time;
an operation unit that inputs the set value through the input screen;
graph generating means that generates a graph indicating a variation in the transmission power over time using the set value input from the operation unit; and
a display unit that displays the input screen and the graph.

2. The mobile communication terminal test device according to claim 1,
wherein the input screen generating means generates an input screen for inputting transmission power before the variation, transmission power after the variation, and a transmission power variation per predetermined unit time as the set values, and
the operation unit inputs the set values of the transmission power before the variation, the transmission power after the variation, and the transmission power variation per predetermined unit time.

3. The mobile communication terminal test device according to claim 1, further comprising:
change point setting means,
wherein the input screen generating means generates an input screen for inputting the set values of the transmission power of each of a plurality of change points (P1 to P4) where the transmission power is varied over time and a time interval between the change points,
the operation unit inputs the set values of the number of change points, the transmission power of each of the plurality of change points, and the time interval between the change points, and
the change point setting means directs the graph generating means to generate a graph to which each set value related to the change points input by the operation unit is applied.

4. The mobile communication terminal test device according to claim 1,
wherein the pseudo base station device according to claim 1 is provided as a first pseudo base station device,
the mobile communication terminal test device further includes:
a second pseudo base station device that is provided separately from the first pseudo base station device; and
transmission power setting means, the input screen generating means generates an input screen for inputting a first set value for varying the transmission power of the first pseudo base station device from a first transmission power level to a second transmission power level over time and a second set value for varying the transmission power of the second pseudo base station device from the second transmission power level to the first transmission power level over time, the operation unit inputs the first set value set to the first pseudo base station device and the second set value set to the second pseudo base station device, and the transmission power setting means sets the first set value input by the operation unit to the first pseudo base station device and sets the second set value input by the operation unit to the second pseudo base station device.

5. The mobile communication terminal test device according to claim 4, wherein, when the operation unit inputs the first set value for varying the transmission power of the first pseudo base station device from the first transmission power level to the second transmission power level, the transmission power setting means determines a set value for varying the transmission power of the second pseudo base station device from the second transmission power level to the first transmission power level to be the second set value, sets the first set value input by the operation unit to the first pseudo base station device, and sets the determined second set value to the second pseudo base station device.

6. A mobile communication terminal test method that tests a mobile communication terminal, which is a test target, in a mobile communication terminal test device including a pseudo base station device which transmits and receives a signal to and from the mobile communication terminal and simulates a base station, comprising:

an input screen display step (S12, S22, S32) of displaying an input screen for inputting a set value for varying transmission power of the pseudo base station device over time;

a set value input step (S13, S23, S33, S34) of inputting the set value;

a graph generating step (S14, S26, S35) of generating a graph indicating a variation in the transmission power over time using the set value input in the set value input step; and a display step (S15, S27, S36) of displaying the graph.

7. The mobile communication terminal test method according to claim 6, wherein the input screen display step (S12) displays an input screen (110) for inputting transmission power before the variation, transmission power after the variation, and a transmission power variation per predetermined unit time as the set values, and the set value input step (S13) inputs the set values of the transmission power before the variation, the transmission power after the variation, and the transmission power variation per predetermined unit time.

8. The mobile communication terminal test method according to claim 6, further comprising:

a change point setting step (S24, S25), wherein the input screen display step (S22) displays an input screen for inputting the transmission power of each of a plurality of change points where the transmission power is varied over time and a time interval between the change points, the set value input step (S23) inputs the set values of the transmission power of each of the plurality of change points and the time interval between the change points, and the change point setting step (S24, S25) sets data for the transmission power of each of the plurality of change points and the time interval between the change points to the graph generated in the graph generating step (S26).

9. The mobile communication terminal test method according to claim 6, further comprising:

a transmission power setting step (S37), wherein the mobile communication terminal test device includes the pseudo base station device according to claim 6 as a first pseudo base station device and further includes a second pseudo base station device that is provided separately from the first pseudo base station device, the input screen display step (S32) generates an input screen for inputting a first set value for varying the transmission power of the first pseudo base station device from a first transmission power level to a second transmission power level over time and a second set value for varying the transmission power of the second pseudo base station device from the second transmission power level to the first transmission power level over time, the set value unit step (S33, S34) inputs the first set value set to the first pseudo base station device and the second set value set to the second pseudo base station device, and the transmission power setting step (S37) sets the first set value input in the set value input step to the first pseudo base station device and sets the second set value input in the set value input step to the second pseudo base station device.

10. The mobile communication terminal test method according to claim 9, wherein, when the first set value for varying the transmission power of the first pseudo base station device from the first transmission power level to the second transmission power level is input in the set value input step (S33, S34), a set value for varying the transmission power of the second pseudo base station device from the second transmission power level to the first transmission power level is determined to be the second set value, and the transmission power setting step sets the first set value input in the set value input step to the first pseudo base station device, and sets the determined second set value to the second pseudo base station device.

* * * * *